A. NELSON.
NUT LOCK.
APPLICATION FILED JULY 29, 1914.
1,190,318.
Patented July 11, 1916.
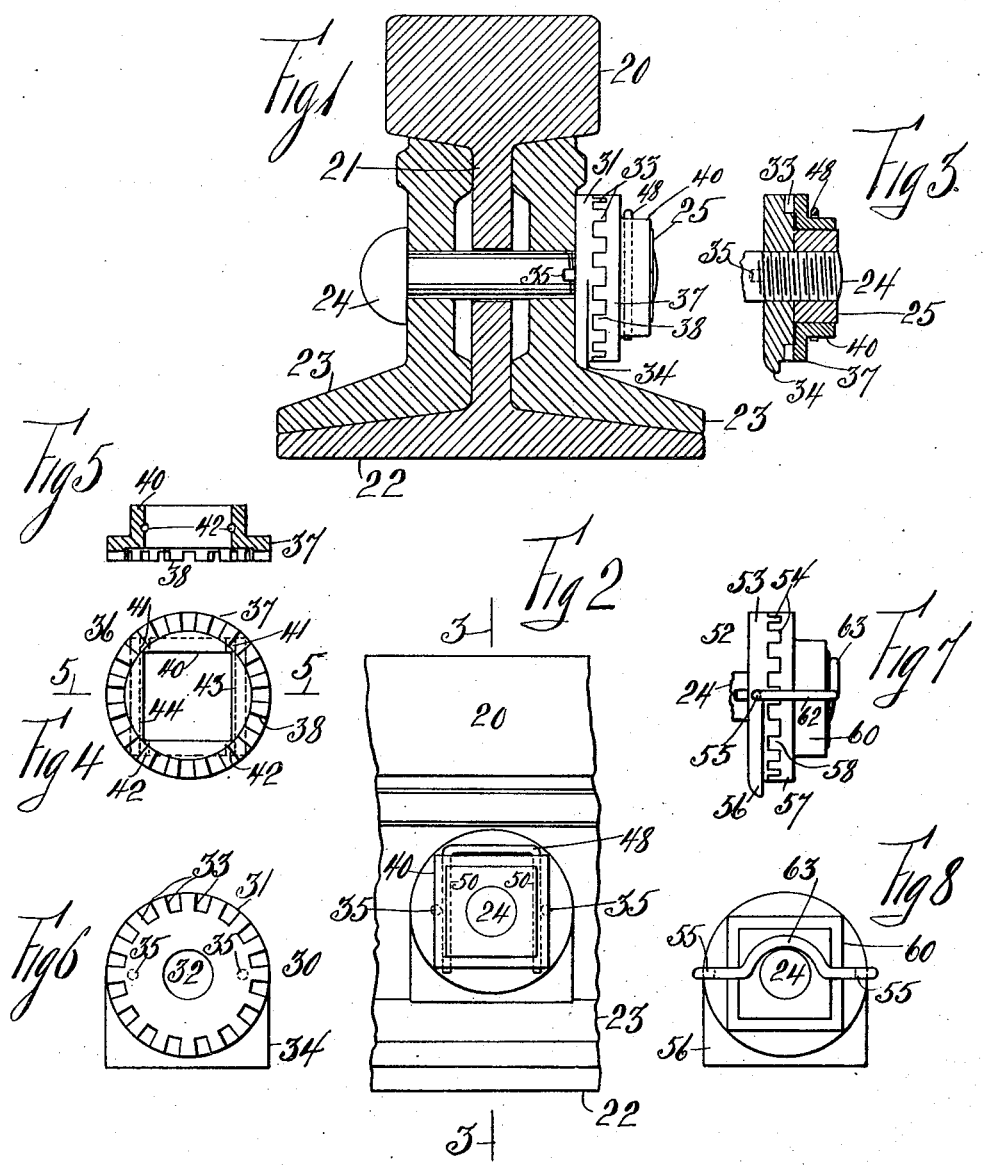
Witnesses:
Inventor
Axel Nelson
By his Attorney

UNITED STATES PATENT OFFICE.

AXEL NELSON, OF NEWARK, NEW JERSEY.

NUT-LOCK.

1,190,318.  Specification of Letters Patent.  Patented July 11, 1916.

Application filed July 29, 1914. Serial No. 853,794.

*To all whom it may concern:*

Be it known that I, AXEL NELSON, a citizen of Sweden, and resident of Newark, in the county of Essex and State of New Jersey, have invented certain new and useful Improvements in Nut-Locks, of which the following is a specification.

This invention relates to a nut lock, which is specially applicable to the nuts of bolts, when used for bolting fish plates to the rails of railroad tracks.

An exemplification of the invention is represented in the accompanying drawings, in which—

Figure 1 shows a side view of the invention with a cross-section of a rail and a pair of fish plates; Fig. 2, represents a right hand side view of Fig. 1; Fig. 3 is a part section of Fig. 2 on the line 3, 3; Fig. 4 shows an elevation of one member of the invention; Fig. 5 is a section of Fig. 4 on the line 5, 5; Fig. 6 represents an elevation of a second member of the invention; Fig. 7 shows a side view of a modified form of the invention and Fig. 8 is a right hand side view of Fig. 7.

Referring particularly to Figs. 1 to 6, a railroad rail is shown with the head 20, web 21 and flange 22. Fish plates 23 are shown in position with said rail and held in position by means of the bolt 24 with the nut 25. A member of the invention is indicated in its entirety by the numeral 30, and comprises the barrel 31, with the central opening 32 and with the teeth 33 extending therefrom. An abutting flange 34 extends from the lower portion of the barrel 31, and locking pins 35 extend from its rear face. A second member of the invention is indicated in its entirety at 36 with the barrel 37 having formed therewith the teeth 38. A box flange is indicated at 40 with the openings 41, 42 in its top and bottom portions respectively and the grooves 43, 44 in its side portions. A U shaped locking pin 48 is provided for the said openings and the grooves in the box flange 40.

To locate the invention in operative position the bolt 24 is placed through an opening in the web 20 and through openings in the fish plates 23. Next the member 30 is placed on the bolt with the abutting flange 34 abutting on the lower leg of its accompanying fish plate, and if the pins 35 are on the member 30, they are locked with the openings in its accompanying fish plate. Next the nut 25, which preferably has grooves 50 in two of its sides is secured in place on the bolt 24 with its inner face bearing against the member 30. Then the second member 36 is placed over the nut 25, and locked by means of its teeth to the member 30. The U shaped locking pin 48 is placed in position in the openings 41, 42 and grooves 43, 44 and 50.

In the modification of the invention shown in Figs. 7 and 8, a member 52 is shown which is similar to the member 30. It comprises the barrel 53 with the teeth 54 extending therefrom, and has cavities 55 in the sides thereof. An abutting flange 56 similar to 34 extends from the barrel 53. A second member of the invention is shown with the barrel 57 similar to 37. It has formed therewith the teeth 58. A box flange 60 is formed with said second member. A clamping pin is shown with the legs 62 and the curved connecting member 63. The legs 62 are engaged in the cavities 55, and the connecting member 63 is located upon the top edges of the box flange 60 and partially around the end of the bolt 24. The pins 35 of the member 30 may be omitted if desired.

Having described my invention what I desire to secure by Letters Patent and claim is:

1. In a nut lock of the character described the combination of a member with teeth formed therewith, and having means incorporated therewith to prevent its turning when in operative position, a second member having teeth to lock with the first member, the second member adapted to engage a nut of a bolt and means to lock the said second member with said nut.

2. In a nut lock of the character described the combination of a member with an abutting flange and teeth, a second member having teeth to lock with the first member, the said second member adapted to engage a nut of a bolt and a pin locking the said second member with said nut.

3. In a nut lock of the character described the combination of a member with an abutting flange and teeth, a second member with teeth to lock with the first member and having a box flange formed therewith, the said second member adapted to engage a nut of a bolt and a pin locking the said second member with said nut.

4. In a nut lock of the character described, the combination of a member comprising a barrel having a central opening and with teeth extending therefrom and also having an abutting flange to bear against an object to prevent said member turning, a second member comprising a barrel having a central opening and with teeth extending therefrom to lock with the first member, said second member having a box flange formed therewith to engage the nut of a bolt and a pin locking said box flange with said nut.

Signed at Newark, in the county of Essex and State of New Jersey, this fourteenth day of July A. D. 1914.

AXEL NELSON.

Witnesses:
CHAS. B. DUNCAN,
HENRY A. BRYDON.

Copies of this patent may be obtained for five cents each, by addressing the "Commissioner of Patents, Washington, D. C."